United States Patent [19]

Michael

[11] 4,007,711

[45] Feb. 15, 1977

[54] ANTI-PEST PET DISH

[76] Inventor: John E. Michael, 2530 Cherry Lane, Walnut Creek, Calif. 94596

[22] Filed: May 2, 1975

[21] Appl. No.: 573,963

[52] U.S. Cl. .................................. 119/51.5; 119/62
[51] Int. Cl.² ......................................... A01K 5/00
[58] Field of Search ...................... 119/51.5, 61, 62

[56] References Cited

UNITED STATES PATENTS

| 395,490 | 1/1889 | French | 119/51.5 |
|---|---|---|---|
| 1,895,702 | 1/1933 | Burley | 119/61 X |
| 1,896,096 | 2/1933 | Parker | 119/61 |
| 2,191,811 | 2/1940 | Trampier, Sr. | 119/51.5 |
| 2,543,465 | 2/1951 | Morey | 119/51.5 |
| 2,933,063 | 4/1960 | Geerlings | 119/62 X |
| 3,077,863 | 2/1963 | Chilovich | 119/62 |

FOREIGN PATENTS OR APPLICATIONS 896,979  3/1945  France

Primary Examiner—Hugh R. Chamblee

[57] ABSTRACT

An anti-pest variable height pet dish having a central food bowl with a pet-operable lid and an annular moat-type water trough removably or fixedly mounted around the central bowl, the moat and bowl being elevatable by means of telescopic legs or a tapered sectional pedestal having removable sections.

3 Claims, 8 Drawing Figures

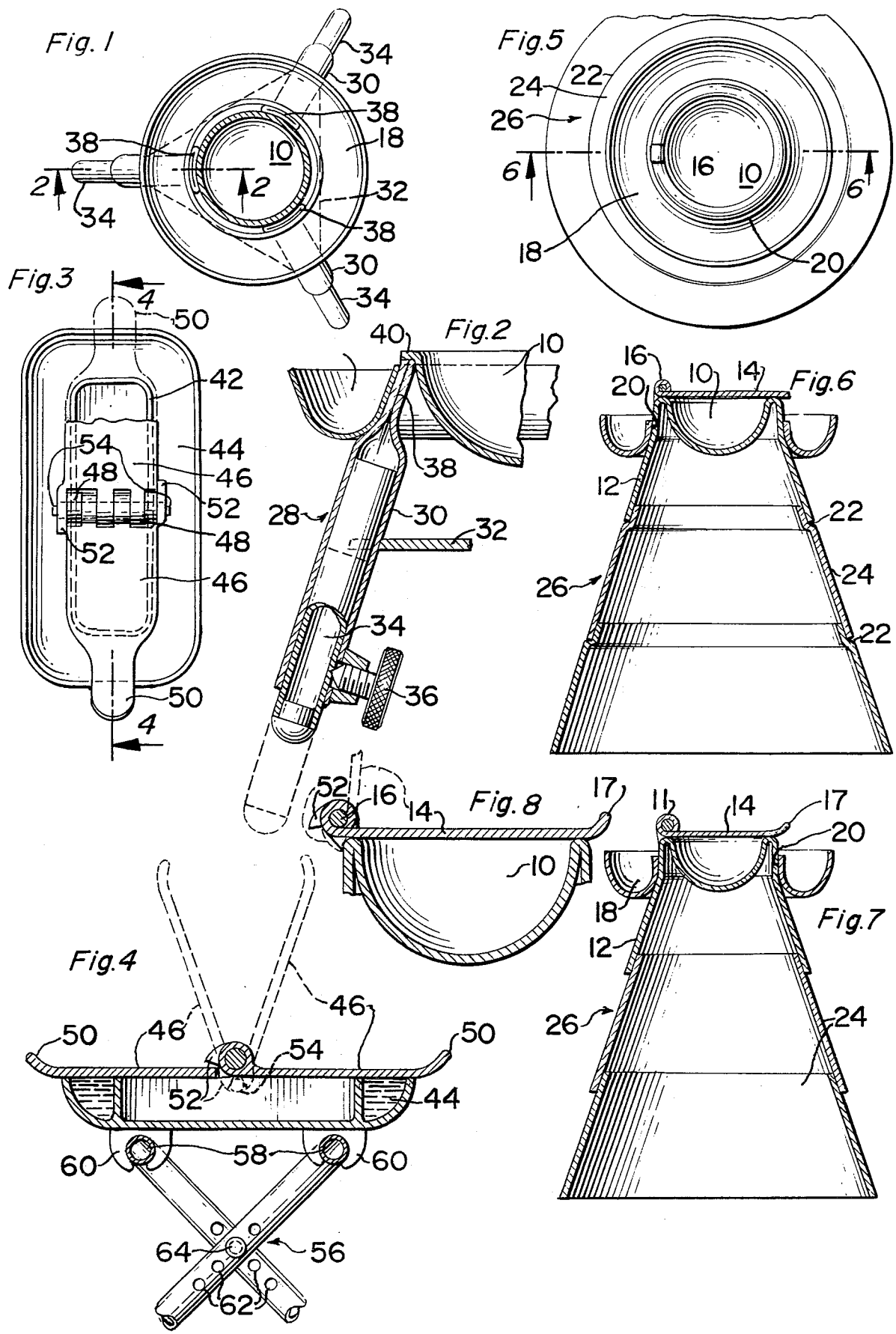

ANTI-PEST PET DISH

BACKGROUND OF THE INVENTION

The invention relates primarily to pet feeding dishes designed to exclude insects, birds, rodents and other pest, and also to variable-height pet dishes which are elevated both to reduce access to the food by pests and to enable large dogs to eat in a normal standing position.

The contamination as well as consumption of pet food by pests is an old problem, especially in the summertime when dogs and other pets are often fed out of doors, and the general concept of providing a pest-free feeding dish is also old as evidenced by U.S. Pat. No. 2,584,310. However, that structure, while perhaps helpful in excluding crawling insects, is not effective in eliminating flying insects and birds, which are generally a greater threat. In addition to preventing access to pet food by pests, it is desireable that the elevation of pet's food be approximately that of his head to enable the pet to feed without bending down and cramping his stomach and digestive system.

SUMMARY OF THE INVENTION

The present invention is a feeding dish designed to exclude pests of all types and is provided as well with variable elevation means so that one unit can be sold which will serve a pet of any height, and in the case of a dog acquired as a pup, the dish can be elevated gradually to keep pace with the dog's growth.

Pest elimination is accomplished both by a moat surrounding the food bowl and doubling as a water dish, and a hinged transparent lid which covers the food bowl and has an extended tab by which the pet may lift the lid with his head. Variable elevation may be achieved with telescoping legs or several mating frustoconical sections which support the dish and may be used in any number to provide the proper elevation.

BRIEF DESCRIPTION OF THE DRAWINGS

FIG. 1 is a top plan view of an embodiment having telescopic legs;

FIG. 2 is a section view taken along line 2—2 of FIG. 1;

FIG. 3 is a top plan view with a portion cut away of an elongated embodiment having twin lids;

FIG. 4 is a section view taken along line 4—4 of FIG. 3;

FIG. 5 is a top plan view of a further embodiment with the lid removed;

FIG. 6 is a section view taken along line 6—6 of FIG. 5 illustrating the mating sections of the support pedestal;

FIG. 7 is a view similar to FIG. 6 in which the sectional support is varied slightly;

FIG. 8 is a diagrammatic vertical section of a bowl and lid assembly of the type illustrated in FIGS. 5-7.

DETAILED DESCRIPTION OF THE PREFERRED EMBODIMENT

The invention in its basic form comprises a central bowl portion 10 having tapered skirt-like sides 12, the bowl and skirt preferably being molded as a single plastic unit. A lid 14 is attached to one edge of the bowl by a hinge 16 which could be of conventional construction as shown or simply a piece of permanent tape adhered to the lid and upper rim of the bowl. The lid is preferably made of transparent plastic to be relatively light in weight and permit the status of the food supply to be determined at a glance. The lid is provided with an extended upwardly curved tab 17 by which the pet can lift the lid with his nose, and to prevent the lid from swinging over the center so that it will fall closed automatically when the animal is finished, a slight protrusion 19 is provided at the hinged edge of the lid to strike the edge of the bowl prior to the lid achieving the vertical position.

An annular moat or trough 18 is disposed around the bowl 10 to serve as a prophylactic against crawling insects and to provide water for the pet. The moat could be an integral part of the bowl portion, or a separate piece having a tapered inner wall 20 which mates flushly with the skirt 12 of the bowl and is held in place by gravity. As shown in FIGS. 6 and 7, the central food bowl is elevated somewhat above the water trough to provide easier access thereto by the pet.

To accommodate pets of different sizes, and to keep up with a growing dog, the dish should have means of elevation to various heights. This can be accomplished in several different ways. As shown in FIG. 6, the skirt of the bowl mates snugly in an annular shoulder 22 of the uppermost section 24 of a pedestal 26 which is comprised of as many sections as are required, each of these frustoconical sections mating with adjacent sections as the bowl 10 mates with section 24.

A slight variation of the sectional pedestal is shown in FIG. 7, wherein shoulders are not provided and the sections nest on each other due to their frustoconical shape.

In a modified embodiment illustrated in part in FIGS. 1 and 2, the dish 10 is supported on a tripod arrangement of telescopic legs 28 having sleeve sections 30 which are maintained in place by a brace 32, and extensible feet portions 34 which telescope within the sleeves and are maintained at the desired length of extension by screwtype detents 36 or other suitable means, such as plural holes in the sleeves and legs through which pins are inserted.

The upper ends of the legs are crimped flat as at 38, and in the illustrated embodiment the skirt 12 of the bowl has been deleted and replaced by a flange or lip 40 so that the bowl is supported by this lip on the legs. The trough 18 rests snugly on the crimped portions of the sleeves as shown in FIG. 2. Clearly the bowl 10 complete with the skirt could also be used in this embodiment with slight modification.

A further embodiment illustrated in FIGS. 3 and 4 incorporates an elongated bowl portion 42 which is integrally molded with the surrounding water trough 44. This dish will simultaneously feed two or more without the mutual jealousy which is often incurred during simultaneous feeding from the same dish. To accomplish this, a pair of lids 44 are commonly hinged at 46 across the center of the dish, each of the lids having an extended tab 50 which in this instance may extend across the trough to be easily liftable by the pets. As shown in phantom in FIG. 4, the lids will swing open independently, and to prevent over-the-center movement the opposite edges of each lid are provided with a protrusion 52 near the hinge area which strikes one of the studs 54 projecting from opposite sides of the food bowl portion of the dish.

Elevation of the elongated dish may be accomplished by one of the methods already described, or a common tray support assembly can be used as shown in FIG. 4, wherein two inverted U-shaped leg member 56 are fastened by their crossbars 58 in clips 60 such that the legs 62 cross and are pinned together as at 64 through any pair of the holes 66 provided therein, so that elevation may be varied according to the holes chosen.

The entire structure as thus described is relatively cheap to manufacture, and effectively prevents access to pet food by either airborn or terrestrial pests, and offers food at a convenient height to pets of any size.

I claim:

1. A pet feeding and watering dish comprising:
   a. a central bowl portion for containing pet food;
   b. a lid having one edge thereof hinged to said bowl portion and an edge opposite said one edge which extends beyond said central bowl such that a pet can raise said lid by lifting said extended edge;
   c. stop means on said lid to prevent the raising thereof to a vertical position; and
   d. a removable annular water trough portion surrounding encircling said central bowl portion to provide water accessible to a pet and prevent access to said bowl portion by crawling insects and permit the separation of said water trough portion from said bowl portion for washing,
   e. said central bowl portion having an outwardly tapered skirt and said trough having a complementary tapered radially inner wall such that when placed around said skirt said trough portion is maintained thereon by friction and gravity.

2. Structure according to claim 1 wherein said dish has self-elevation means comprising a plurality of separable mating frustoconical sections of graduated sizes together defining a generally conical composite exterior to define a pedestal for said bowl portion, whereby bowl elevation is adjustable by removing one or more of said sections.

3. Structure according to claim 1 wherein said dish has elevation means comprising at least three telescopic legs and including a brace connected to said legs and supporting same in a spaced upright position, and said bowl portion has an annular lip which rests on the upper ends of said legs to support said bowl.

* * * * *